United States Patent [19]

Hanatsuka

[11] Patent Number: 5,394,546
[45] Date of Patent: Feb. 28, 1995

[54] DATABASE MANAGEMENT SYSTEM AND METHOD OF EXTENDING SYSTEM FUNCTIONS

[75] Inventor: Mitsuhiro Hanatsuka, Yokohama, Japan

[73] Assignee: Hitachi, Ltd., Tokyo, Japan

[21] Appl. No.: 782,075

[22] Filed: Oct. 24, 1991

[30] Foreign Application Priority Data

Nov. 7, 1990 [JP] Japan .................................. 2-299694

[51] Int. Cl.[6] .............................................. G06F 7/00
[52] U.S. Cl. .............................. 395/600; 364/DIG. 1; 364/282.1; 364/280.4; 364/280.7; 395/700
[58] Field of Search ............................... 395/600, 700; 364/DIG. 1, 282.1, 280.4, 280.7

[56] References Cited

PUBLICATIONS

Crary, F. D., "A Versatile Precompiler for Nonstandard Arithmatics", ACM Tran. on Math. Software, v. 5, N. 2, Jun. 1979, pp. 204–217.

Burton, W., "A Fortran Preprocessor to Support Encapsulated Data Abstraction Definitions", The Computer Journal, v. 22, N. 4, 1979.

Ancona, M. et al., "Integrating Library Modules into Pascal Programs", Software–Practice and Experience, vol. 14(5) 401–412 (1984).

Primary Examiner—Kevin A. Kriess
Assistant Examiner—A. Katbab
Attorney, Agent, or Firm—Fay, Sharpe, Beall, Fagan, Minnich & McKee

[57] ABSTRACT

There are stored in advance a data type, a data type definition, and a data processing procedure associated with the data type. The data type definition is developed and inputted to a compiler. An output of the compiler and the data processing procedure are inputted to a linkage editor, thereby extending an interface of the database management system.

9 Claims, 7 Drawing Sheets

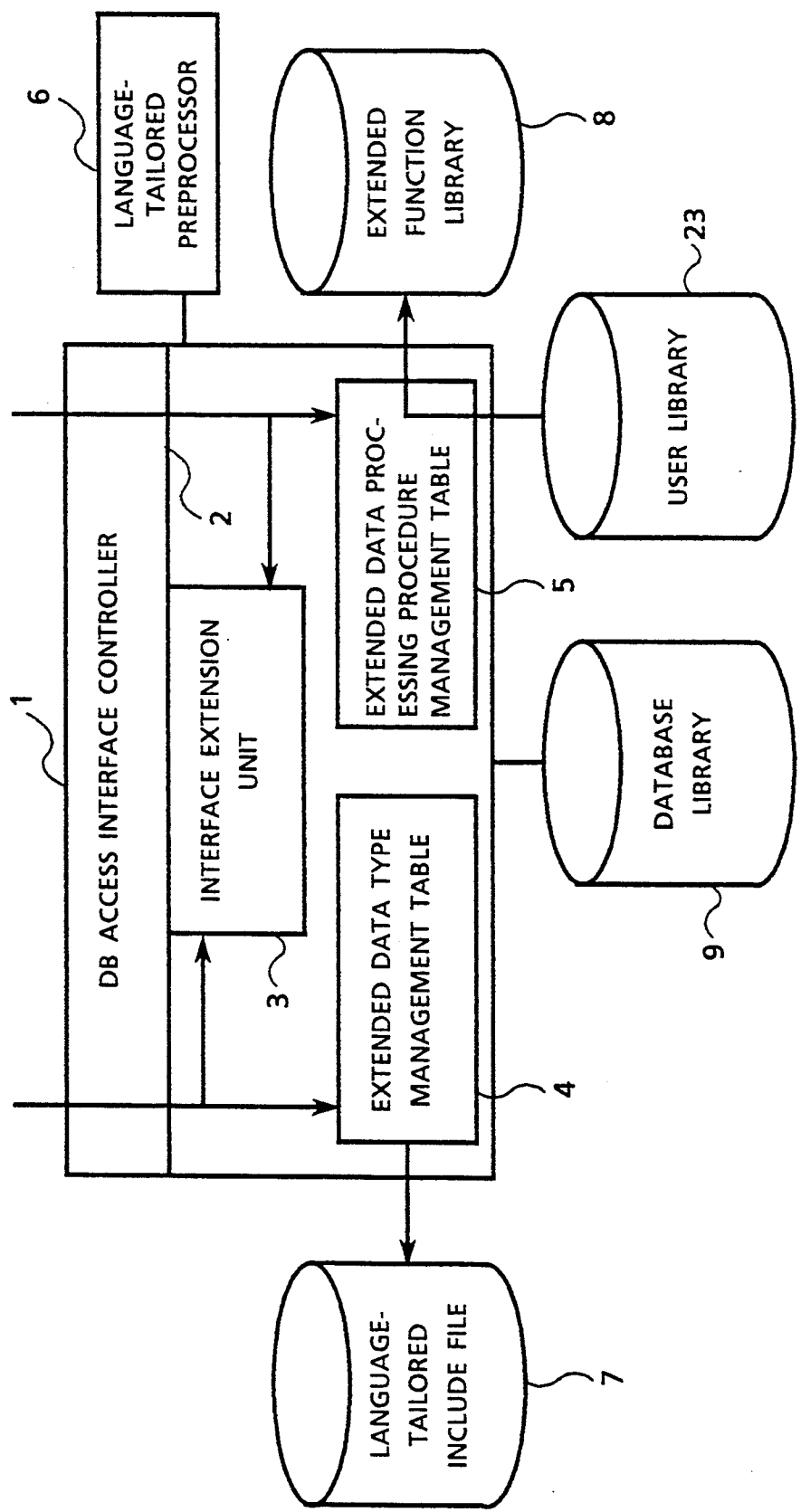

FIG. 2

| LANGUAGE TYPE | EXTENDED DATA TYPE NAME | EXTENDED DATA TYPE DEFINITION | DEFINITION FILE NAME |
|---|---|---|---|
| FORTRAN | IMAGES | INTEGER LENGTH<br>INTEGER WIDTH<br>INTEGER PIC (256,256) | INCFORT |
| ⋮ | ⋮ | ⋮ | ⋮ |

FIG. 3

| PROCESSING TYPE | LANGUAGE TYPE | PROCESSING PROCEDURE INTERFACE | PROCESSING PROCEDURE FILE NAME |
|---|---|---|---|
| LIB | FORTRAN | SUBROUTINE ROTATION (FIG,RL,ANGLE)<br>IMAGES FIG<br>CHARACTER RL<br>INTEGER ANGLE | IMGROT |
| ⋮ | ⋮ | ⋮ | ⋮ |

EXTENDED DATA TYPE DEFINITION COMMAND

DEFINE DATA TYPE <DATA TYPE NAME> BY <LANGUAGE TYPE>
                                    <DATA TYPE DEFINITION>   — 15

PROCESSES AFTER COMMAND ANALYSIS

START → REGISTER DATA TYPE IN EXTENDED DATA TYPE MANAGEMENT TABLE (16) → UPDATE LANGUAGE-TAILORED INCLUDE FILE (17) → EXTENDED DB ACCESS INTERFACE (18) → END

EXTENDED DATA PROCESSING PROCEDURE
REGISTRATION COMMAND
⎯⎯⎯⎯⎯⎯⎯⎯⎯⎯⎯⎯⎯⎯⎯⎯⎯⎯⎯⎯⎯⎯⎯⎯⎯⎯⎯⎯⎯⎯⎯⎯⎯⎯⎯⎯

DEFINE FUNCTION <PROCEDURE TYPE> BY <LANGUAGE TYPE>

ON<PROCEDURE FILE NAME> <PROCEDURE INTERFACE>

PROCESSES AFTER COMMAND ANALYSIS

DATABASE MANAGEMENT SYSTEM AND METHOD OF EXTENDING SYSTEM FUNCTIONS

BACKGROUND OF THE INVENTION

The present invention relates to database management for computers, and more particularly to a database management system and a method of extending system functions suitable particularly for multi-media databases.

As disclosed in Section 4, Configuration and Internal Structure of Relational Database in a publication "Relational Database Management System", p. 88–89, November (1986): by Takayuki HIRAO, published by Kindaikagaku-sha, a conventional database management system manages databases by assigning data a particular attribute or standard data type (such as characters and numbers) so as to share the databases. It is also disclosed that data processing procedures such as data retrieval, updating, and calculation are provided in correspondence with standard data types such as characters and numbers.

According to the above-described prior art, a database management system is provided only with standard data types. Therefore, among data stored in a database, data having a data type different from the standard data types, such as a data type of multi-media data, cannot be managed. However, in such a database management system, even if data having a multi-media data type is assigned a different attribute and stored in a database, this multi-media data cannot be processed, although data having a standard data type can be processed, e.g., retrieved or updated.

Accordingly, a multi-media database in a conventional database management system is realized as a dedicated file to a user application program (UAP) which acts to recognize a data structure and process the data for the system.

SUMMARY OF THE INVENTION

It is an object of the present invention to provide a database management system and a method of extending system functions, capable of managing and executing data having a different data type from standard data types, particularly a multi-media data type, and allowing sharing of databases by a number of UAPs.

In order to allow the management of databases of a multi-media type, the present invention provides a database management system comprising: first means for storing a defined data type; and second means for extending an interface of the database management system when the defined data type is stored in the first means.

In order to allow the processing of databases of a multi-media type, the present invention provides a database management system having a compiler and a linkage editor, comprising: first means for storing a data type and a data type definition for each language; and second means for storing a data processing procedure associated with the data type, wherein the data type definition stored in the first means is developed, or converted and inputted to the compiler, and the linkage editor is inputted with an output from the compiler and the data processing procedure stored in the second means.

The present invention also provides a database management system having a compiler and a linkage editor, comprising: first means for storing a defined data type and a data type definition corresponding to the defined data type; second means for storing the data type and the data type definition for each language, the data type and the data type definition being updated each time the data type and the data type definition are stored in the first means; third means for developing, or converting the data type definition stored in the second means and inputting the developed data type definition into the compiler; fourth means for storing a location where the data processing procedure associated with the defined data type is stored; and fifth means for storing the data processing procedure associated with the data type in the form of a load module, in accordance with the location stored in the fourth means, wherein an output from the compiler and the data processing procedure stored in the fifth means are inputted to the linkage editor.

The present invention also discloses a method of extending functions of a database management system.

In forming a UAP load module, the data type definition stored in the means for storing the data type and data type definition is inputted to the language-tailored preprocessor which develops the data type definition of an extended data type and inputs it to the compiler. A load module is thus generated from the linkage editor.

An inquiry to a database management system is generally made by an SQL (Structured Query Language), so that only a limited number of commands can be acknowledged. However, according to the present invention, using the data type and data processing procedure defined by a media manager, it becomes possible to extend a data type which can be acknowledged by an SQL interface, and process the data of the extended data type.

BRIEF DESCRIPTION OF THE DRAWINGS

FIG. 1 is a block diagram showing the overall arrangement of an embodiment of a database management system according to the present invention;

FIG. 2 shows an example of the format of an extended data type management table;

FIG. 3 shows an example of the format of an extended data processing procedure management table;

DESCRIPTION OF THE PREFERRED EMBODIMENT

Figures 4, 5:
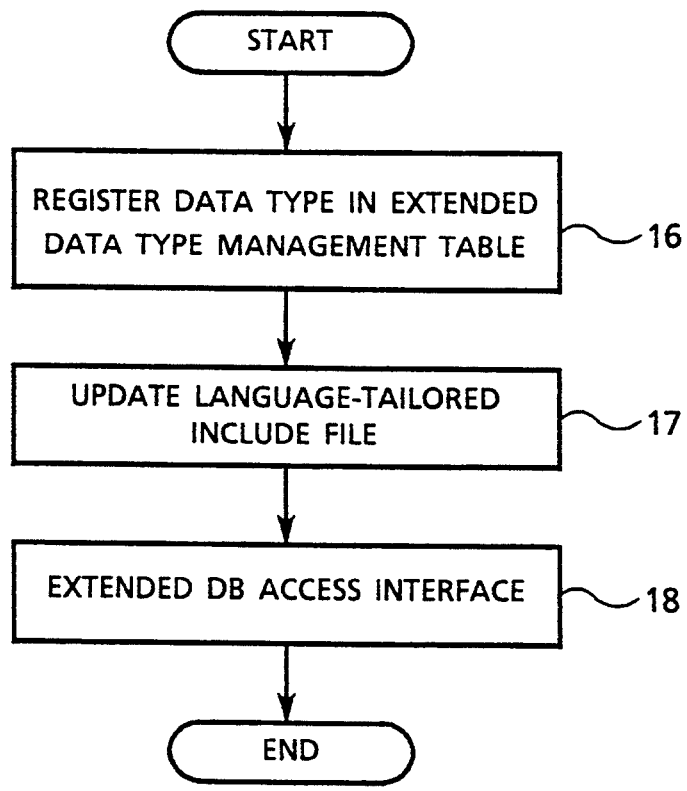
FIG. 4 shows an example of the format of an extended data type definition command.
FIG. 5 is a flow chart illustrating an extended data type definition operation of the database management system.

An embodiment of the present invention will be described in detail with reference to the accompanying drawings.

FIG. 1 is a block diagram showing the overall arrangement of a database management system incorporating a system function extending method according to the present invention.

The database management system 1 has a database (hereinafter abbreviated as DB where applicable) access interface controller 2, an interface extending unit 3, a language-tailored preprocessor 6, a language-tailored include file 7, and an extended function library 8. The language-tailored preprocessor 6 runs on a program which processes a source program written by a particular language prior to being compiled so that a data type defined by a user is substituted by a standard data type which can be processed by a compiler. The language-tailored include file 7 is one of the input files to the language-tailored preprocessor 6. This file 7 stores a correspondence between each user defined data type and each standard data type. Using this definition information, it becomes possible to substitute a multi-media data type in a source program by a standard data type so that the source program can be processed using a general compiler. The database management system further includes, as catalogs, an extended data type management table 4 and an extended data processing procedure management table 5. These catalogs are used for confirming if a data type and/or data processing procedure such as data calculation can be used by a user. The system itself extends its function when a data type or data processing procedure is registered. A user is allowed to access latest information each time a new extension becomes available.

The term "data type" herein used also means a data type name that a user has defined newly, and the term "data type definition" is a definition identifying the configuration and structure of a newly defined data type by using already existing data types.

The DB access interface controller 2 is a component for analyzing a command request from an end user or from a UAP to control an access to a database in accordance with the analyzed result. The interface extension unit 3 is a sub-component of the DB access interface controller 2, having a function to extend a DB access interface by using newly added commands (data type definition command, data type processing procedure registration command) of the present invention. The extended data type management table 4 is used for managing data types defined by users. The extended data processing procedure management table 5 is used for managing data processing procedures defined by users. The language-tailored include file 7 is a file for storing the data types and data type definitions defined by users, in terms of each language, this file being one of input files to the language-tailored preprocessor 6. The extended function library 8 is a library for storing data processing load modules defined by users. A data processing load module is a program which processes data having a certain data type, the processes including an essential process of comparing data, and other processes including rotating, magnifying, and reducing graphics data. If such a data processing program is registered for data having an extended data type defined by a user, other users can share this program.

Next, an example of an operation of the database management system 1 when a user defines a new data type, will be described with reference to FIGS. 1, 4, 5, and 11.

According to the present invention, there is provided a data type definition command 15 such as shown in FIG. 4 for defining a data type. When this data type definition command 15 is issued, the DB access interface controller 2 acknowledges it at step 39 and analyzes it at step 40 to thereafter execute an extended data type registration process for a DEFINE DATA TYPE command at step 43.

FIG. 5 is a flow chart illustrating the extended data type registration process at step 43. In accordance with the analyzed information of the extended data type definition command 15, the database management system 1 stores the data type in the extended data type management table 4 (at step 16). An example of the structure of the extended data type management table 4 is shown in FIG. 2. The extended data type management table 4 is composed of a language type, a data type name, a data type definition, and a definition file name. Returning back to FIGS. 1 and 5, the language-tailored include file 7 is then updated in accordance with the language type (at step 17). Lastly, the interface extension unit 3 extends the DB access interface controller 2 (at step 18).

If a user tries to access the data having a newly defined data type and stored in a database, the DB access interface controller 2 searches the extended data type management table 4 in accordance with a command entered by the user, to check if the data type of the data of concern has already been registered in the table 4. If there is the data type, it allows the user to access the database. In this manner, data types can be extended. Data read/write relative to a database can be executed in accordance with the data type definition of a data type entered by a user when accessing the database.

Next, an example of an operation of the database management system 1 when a user registers a new data processing procedure, will be described with reference to FIGS. 1, 6, 7, and 11.

Figures 6, 7:
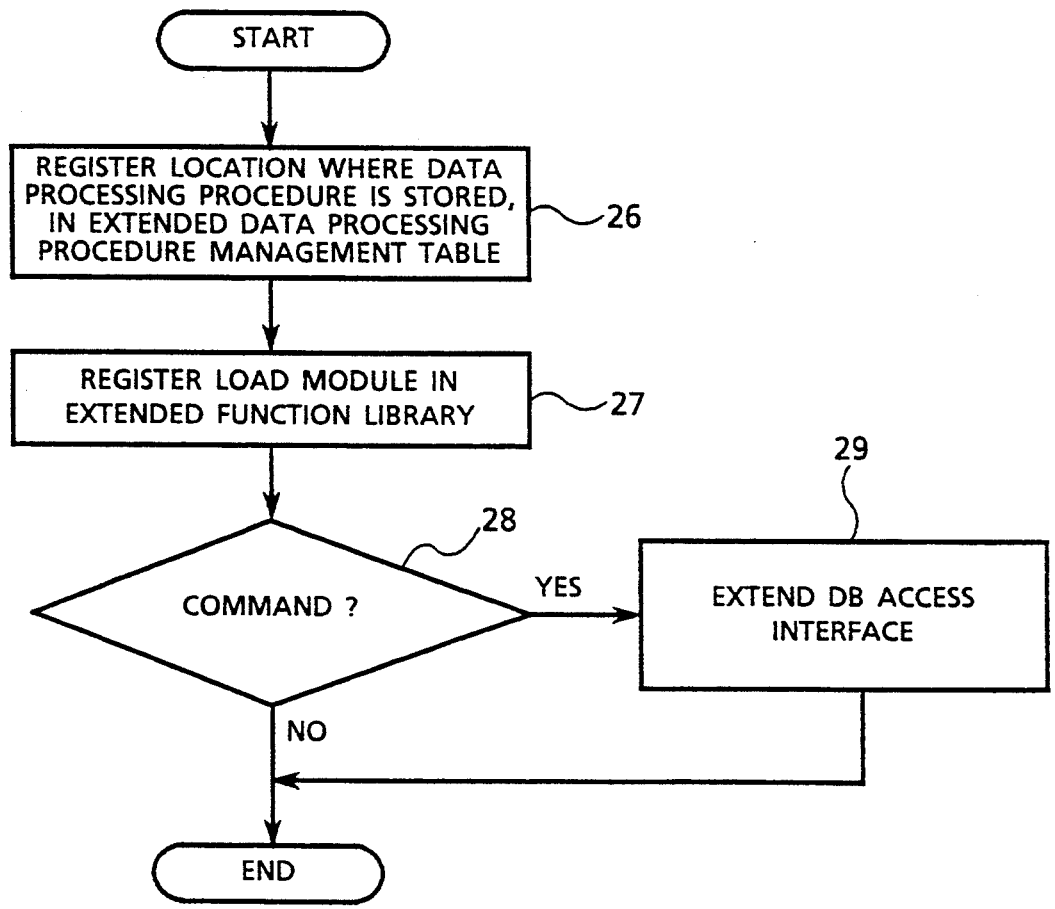
FIG. 6 shows an example of the format of an extended data processing procedure registration command.
FIG. 7 is a flow chart illustrating a data definition operation of the database management system.

According to the present invention, there is provided an extended data processing procedure registration command 25 such as shown in FIG. 6 for registering an extended data processing procedure. When this extended data processing procedure registration command 25 is issued, the DB access interface controller 2 acknowledges it at step 39 and analyzes it at step 40 to thereafter execute an extended data processing procedure registration process for a DEFINE FUNCTION command at step 44.

FIG. 7 is a flow chart illustrating the extended data processing procedure registration process at step 44. In accordance with the analyzed information of the extended data processing procedure registration command 25, the database management system 1 stores the command and information representative of the location where the data processing procedure is stored, in the extended data type management table 4 (at step 16). An example of the structure of the extended data processing procedure management table 5 is shown in FIG. 3. The extended data processing procedure management table 5 is composed of a processing procedure type, a language type, a processing procedure interface, and the name of a file storing the data processing procedure. Returning back to FIGS. 1 and 7, a load module of the data processing procedure described by the user and stored in a user library 23 is registered in the extended function library 8 to be managed by the database management system 1 at the location identified by the file name (at step 27). Lastly, the interface extension unit 3 extends the DB access interface controller 2 (at steps 28 and 29).

Figure 8:
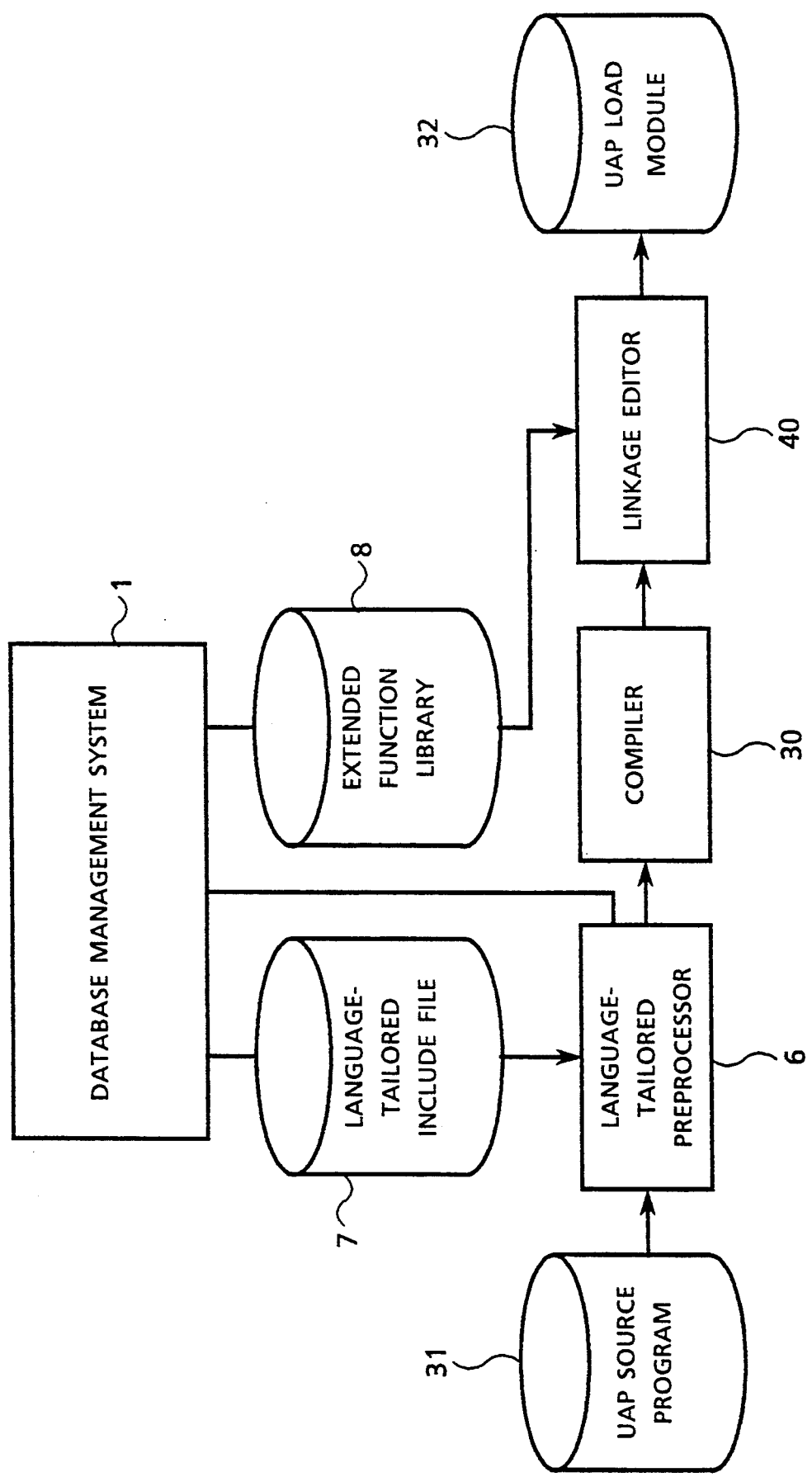
FIG. 8 is a block diagram conceptually illustrating an operation of forming a UAP.

Next, there will be described a procedure of generating a load module from a UAP source program, using the extended data type and data processing procedure, with reference to FIG. 8.

The language-tailored preprocessor 6 receives a UAP source program 31 describing therein a data type, and the data type definition corresponding to the data type in concern and stored in the language-tailored include file 7. The language-tailored preprocessor 6 develops the data type into the form which can be compiled by a compiler for each language. The developed source program is inputted to a compiler 30. A linkage editor 40 is inputted with an output from the compiler 30 and a data processing load module stored in the extended function library 8 so that it outputs a UAP load module 32. The compiler 30 converts the UAP source program into an object program having machine codes, and the linkage editor 40 combines a plurality of object programs to generate an executable load module.

An object program for a UAP source program is generated in the above manner. Since the data type definition stored in the language-tailored include file 7 corresponding to the data type in a UAP source program 31 can be used, a programmer is not required to enter the data type definition into the UAP source program. The more the data processing procedures for a data type are registered, a user can use more various types of data processing procedures in generating a load module.

Figure 9:
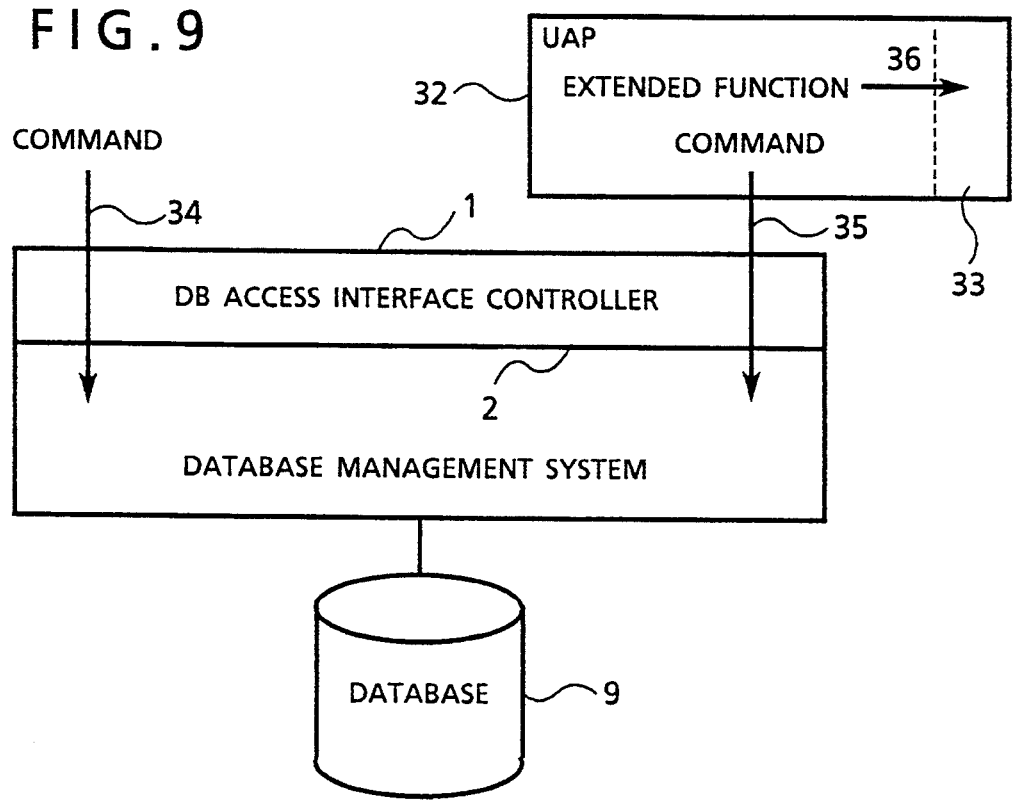
FIG. 9 is a block diagram conceptually illustrating operations of the database management system and a UAP, upon a UAP or user request.

An example of the operation of the database management system 1 upon issuance of a command including an extended data type and data processing procedure, will be described with reference to FIG. 9. Procedures for commands are stored in advance in the database management system 1. Therefore, upon reception of a command (34, 35), input/output operation for an extended data type and extended data processing procedure is carried out in accordance with the stored procedures. On the other hand, an extended function 33 other than a command will provide, is entered in a UAP load module by the linkage editor 40 so that the extended function is executed upon a request 36.

Figure 10:
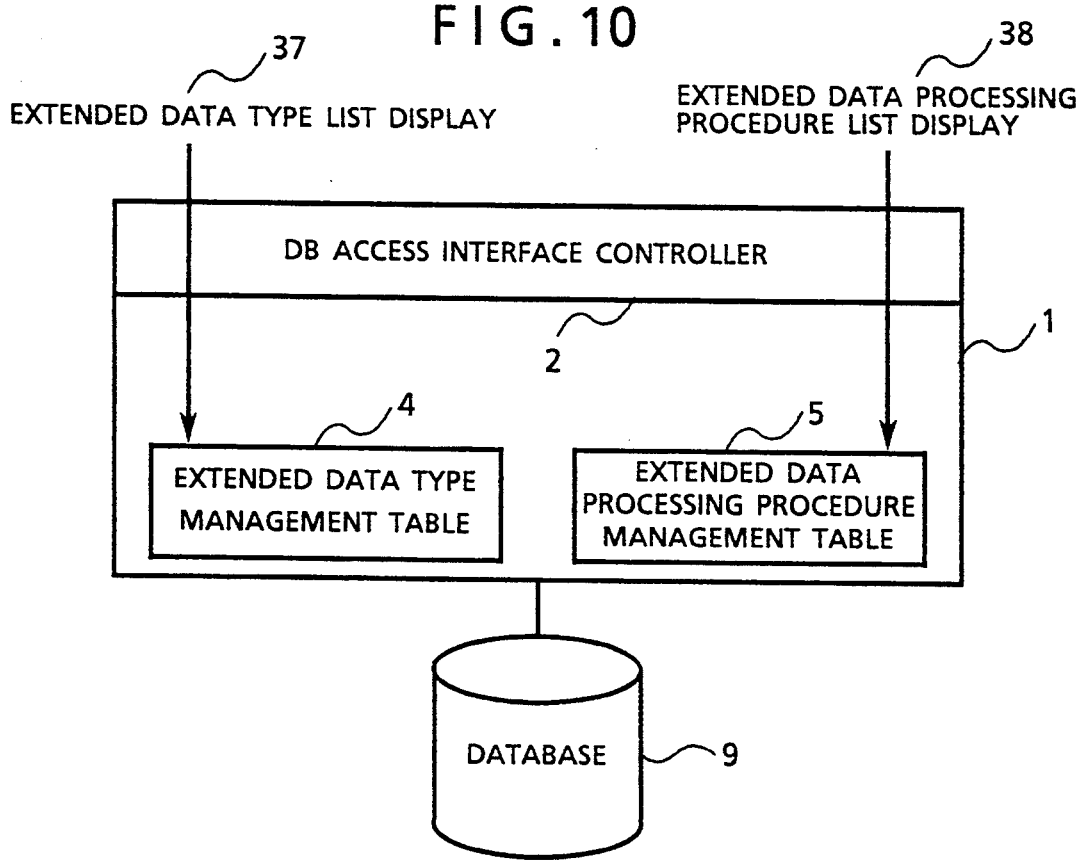
FIG. 10 is a block diagram conceptually illustrating an operation of the database management system upon a request of displaying a list of extended data types or extended data processing procedures.
Figure 11:
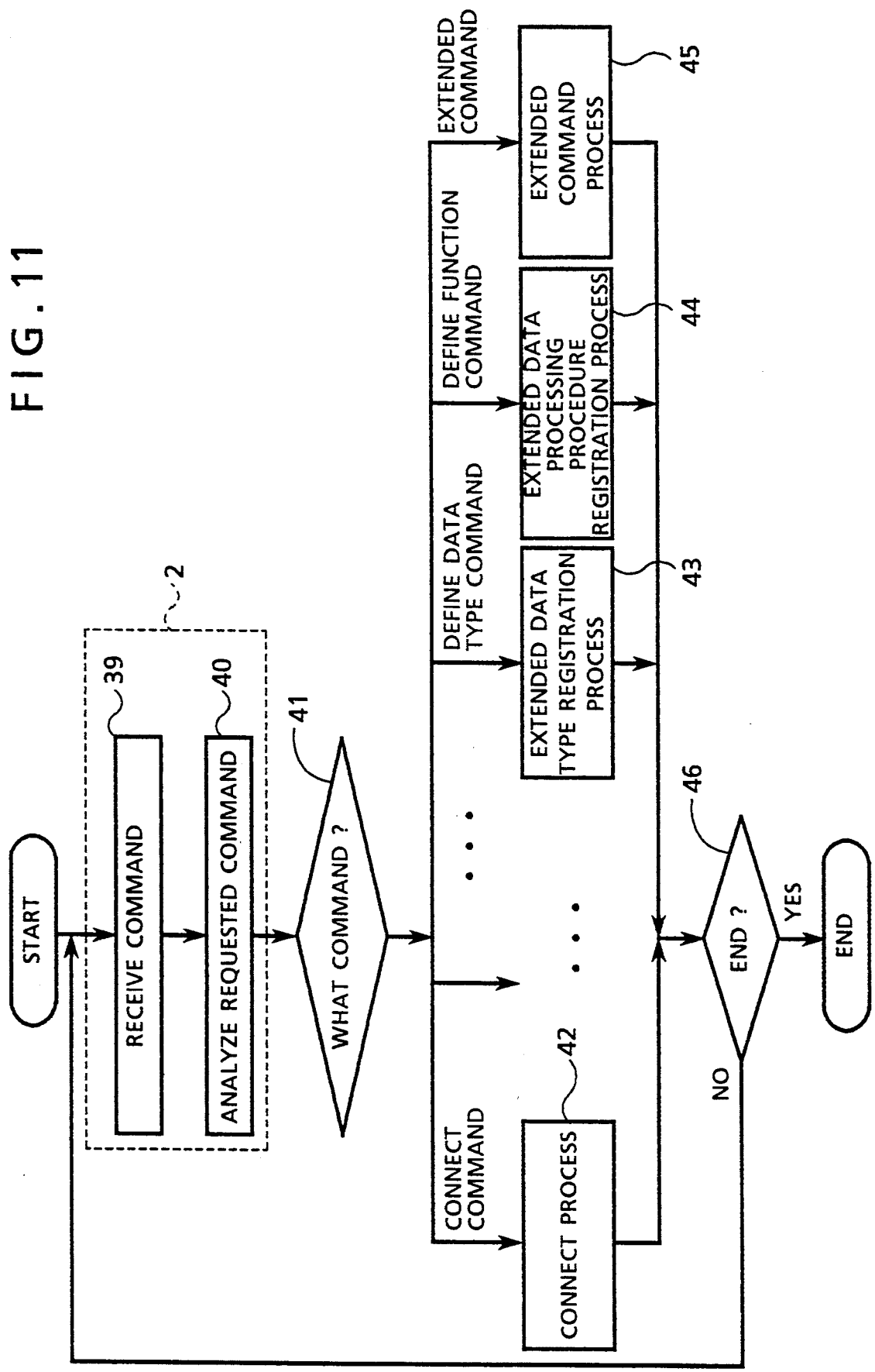
FIG. 11 is a flow chart illustrating the operation of the database management system.

As shown in FIG. 10, in order to facilitate the use of an extended data type and data processing procedure, there are provided an extended data type list display command 37 and an extended data processing procedure list display command 38. The extended data type list display command 37 is used when displaying the contents of the extended data type management table 4. The extended data processing procedure list display command 38 is used when displaying the contents of the extended data processing management table 5.

According to the present invention, a new data type different from standard data types can be defined for data storage and management of a data base management system. A new data type once defined by a user can be shared by other users. Furthermore, a data processing procedure for a new data type can be registered, the data processing procedure including data comparison, data calculation, and the like in the form of programs. Similar to the case of a new data type, a data processing procedure once defined by a user can be shared by other users.

It is possible therefore to realize a database management system with an extended function capable of storing and managing data such as multi-media data which has been otherwise managed by a user differently from conventional data.

What is claimed is:

1. A database management system for operating a database by performing a data processing procedure with respect to the database which is defined by a data type, said database management system comprising:
    a file for storing a correspondence between a user defined extended data type and a standard data type;
    a library for storing a load module corresponding to a user defined extended data processing procedure;
    a catalog for storing a correspondence between a user defined data type/data processing procedure and a definition of the data type/data processing procedure; and,
    a controller for analyzing a command request inputted by a user and for controlling access to said database by using said correspondence in said file and said load module in said library on the basis of said correspondence in said catalog.

2. The database management system according to claim 1, wherein said file stores correspondence between the extended data type and the standard data type based on language types.

3. The database management system according to claim 1, wherein said library stores a module for executing a calculation or a graphic processing with respect to the extended data type.

4. The database management system according to claim 1, wherein said controller includes an extension controller for analyzing the extended data type and the extended data processing procedure defined by the user.

5. The data base management system according to claim 1, wherein the user defined extended data type comprises multimedia data.

6. The data base management system according to claim 1, wherein the standard data type comprises character data and number data.

7. The data base management system according to claim 1, further including means for converting the user defined extended data type to the standard data type in accordance with the correspondence stored in the file.

8. A method for preparing an executable load module from a source program for operating a database by using a data type and a data processing procedure, said method comprising the steps of:
    providing a file for storing a correspondence between a user defined extended data type and a standard data type, and a library for storing a data processing load module corresponding to a user defined extended data processing procedure;
    converting the extended data type in said source program into the standard data type based on the correspondence stored in said file;
    compiling the source program after the conversion by using a compiler;
    combining an output of said compiler with the data processing load module of said library; and,
    generating the executable load module based on the combining.

9. The method according to claim 8 wherein the providing is accomplished upon initialization.

* * * * *